United States Patent
Hellwig

(10) Patent No.: US 8,149,140 B2
(45) Date of Patent: Apr. 3, 2012

(54) PRESSURE-DIFFERENCE WARNING SYSTEM

(75) Inventor: Robert Hellwig, Horst-Hahnenkamp (DE)

(73) Assignee: Airbus Operations GmbH (DE)

(*) Notice: Subject to any disclaimer, the term of this patent is extended or adjusted under 35 U.S.C. 154(b) by 301 days.

(21) Appl. No.: 11/795,433

(22) PCT Filed: Jan. 19, 2006

(86) PCT No.: PCT/EP2006/000445
§ 371 (c)(1),
(2), (4) Date: Jul. 17, 2007

(87) PCT Pub. No.: WO2006/077111
PCT Pub. Date: Jul. 27, 2006

(65) Prior Publication Data
US 2008/0088483 A1    Apr. 17, 2008

Related U.S. Application Data

(60) Provisional application No. 60/644,930, filed on Jan. 19, 2005.

(30) Foreign Application Priority Data
Jan. 19, 2005   (DE) .......................... 10 2005 002 544

(51) Int. Cl.
*G08B 21/00* (2006.01)
(52) U.S. Cl. ........................... 340/945; 340/963; 454/72
(58) Field of Classification Search .................. 340/500, 340/540–541, 945–983
See application file for complete search history.

(56) References Cited

U.S. PATENT DOCUMENTS

| 4,453,154 | A  |   | 6/1984  | Rait et al.                      |
|-----------|----|---|---------|----------------------------------|
| 4,602,248 | A  | * | 7/1986  | Foster et al. ............... 340/601 |
| 5,251,851 | A  | * | 10/1993 | Herrmann et al. ........ 244/129.5 |
| 5,337,977 | A  |   | 8/1994  | Fleming et al.                   |
| 5,702,592 | A  |   | 12/1997 | Suri et al.                      |
| 6,452,510 | B1 | * | 9/2002  | Zysko ......................... 340/970 |
| 6,737,988 | B2 | * | 5/2004  | Horner et al. ............... 340/970 |
| 6,747,557 | B1 | * | 6/2004  | Petite et al. ................. 340/540 |
| 6,919,803 | B2 | * | 7/2005  | Breed ......................... 340/539.14 |
| 7,207,524 | B2 | * | 4/2007  | Puschmann et al. ....... 244/129.5 |
| 7,633,409 | B2 | * | 12/2009 | Naegler et al. ............... 340/945 |
| 2006/0006285 | A1 | * | 1/2006 | Puschmann et al. ....... 244/129.1 |
| 2008/0048889 | A1 | * | 2/2008 | Naegler et al. ............... 340/970 |

FOREIGN PATENT DOCUMENTS

| DE | 29714859 U      | 8/1997  |
| DE | 10223210        | 12/2003 |
| DE | 202004011074 U  | 10/2004 |
| DE | 102004048217    | 4/2006  |
| GB | 735766          | 8/1955  |
| JP | 2093900         | 4/1990  |

(Continued)

*Primary Examiner* — Brian Zimmerman
*Assistant Examiner* — James Yang
(74) *Attorney, Agent, or Firm* — Lerner, David, Littenberg, Krumholz & Mentlik, LLP

(57) ABSTRACT

The present invention relates to a pressure-difference warning system comprising an acoustic signal device, comprising an energy supply device and comprising a pressure sensor. The pressure sensor is designed for measuring a pressure difference between an interior region and an exterior region. The energy supply device is designed for providing energy for operating the warning system. The acoustic signal device is designed for outputting an acoustic signal if the measured pressure difference exceeds a specifiable threshold value.

18 Claims, 2 Drawing Sheets

FOREIGN PATENT DOCUMENTS

| | | |
|---|---|---|
| JP | 4236610 | 8/1992 |
| WO | 02/054035 | 7/2002 |
| WO | 2004/022425 | 3/2004 |
| WO | WO 2004022425 A1 * | 3/2004 |

* cited by examiner

PRESSURE-DIFFERENCE WARNING SYSTEM

REFERENCE TO RELATED APPLICATIONS

This application claims the benefit of the filing date of German Patent Application No. 10 2005 002 544.7 filed Jan. 19, 2005, the disclosure of which is hereby incorporated herein by reference and of U.S. Patent Application No. 60/644,930, filed Jan. 19, 2005 the disclosure of which is hereby incorporated by reference.

FIELD OF THE INVENTION

The present invention relates to a safety system. In particular, the present invention relates to a pressure-difference warning system, a door with a pressure-difference warning system, an aircraft with a pressure-difference warning system or with a door, a method for generating an acoustic signal as a pressure-difference warning signal, a computer-readable storage medium and a program element.

TECHNOLOGICAL BACKGROUND

In the case of aircraft doors, as possible closing devices for apertures in the fuselage, which apertures after landing are to be opened manually even if there is a pressure difference between the cabin (as a rule the side with the higher pressure) and the environment (as a rule the side with the lower pressure), there is the danger that the operator of the door is hurt as a result of the quick opening movement of the door or as a result of the ensuing airstream from the cabin to the outside. As proven by accidents, this particular condition (fault) in which overpressure builds up in an aircraft cabin is a potential source of accidents or danger. In order to reduce the likelihood of accidents from this source, in passenger aircraft, in particular in the passenger doors of the Airbus fleet there is an electrically-operated visual warning display in the form of a small light in the window funnel of the door. The function of the visual warning display installed in the door depends on the on-board network.

If there is a differential pressure and at the same time the triggering of the evacuation-slide is deactivated, the visual warning display emits a visual signal which is to indicate to the user that operation of the door represents a potential hazard and should not be attempted until such time as pressure equalisation has taken place. This poses no grounds for concern if the people on board leave the aircraft in the normal way. In the case of an emergency evacuation of the aircraft, in which case all passengers will have to have left the aircraft within a period of 90 seconds, untrained persons, such as the passengers, would not operate the doors because of the blinking warning light. Consequently there would be a serious delay in the evacuation.

Different philosophies exist in relation to the planning of an emergency evacuation.

On the one hand it is held that in the case of an emergency situation the evacuation time should not be delayed by a small potential hazard posed by a pressurised cabin and by an inordinately long period of waiting. In this case, consequently, the display of the hazardous situation should be omitted.

On the other hand it is held that even in an emergency situation the hazard should be displayed because at any rate only experienced and trained specialist personnel operate the doors and know how to interpret the indications. It should therefore be possible to set various prerequisites for a hazard notification.

Furthermore, as a result of the necessary electrical energy supply the warning function of the visual display is limited to scenarios in which a current supply from the on-board network is available. The warning function is therefore only available if an on-board voltage is present, either externally or internally. Since, in addition, the warning function takes place only visually, a dependency on the degree of illumination of the surroundings is given. Diffused light that enters in an unfavourable manner can thus make it very difficult for an operator to see the warning function.

In order to avoid visual disturbance with a warning function, WO 2004/022425A1 discloses a device to warn of differential pressure during opening of a pressurised closing device of an aperture in the fuselage. Thereby an air duct from the side with higher pressure (passenger cabin) to the side with lower pressure (outside environment) is provided. The air duct can be closed by a valve, wherein said valve can be controlled by means of a control lever that is in effective connection with the door opening mechanism.

Disadvantageously this acoustic signal that has been generated in a mechano-acoustic way is poor in the efficiency for the sound generation. The warning sound is made from air, or more precisely, by air streaming through the aperture. The sound pressure of the warning sound achieved thus directly depends on several parameters. Consequently, an audible warning signal is generated only under very specific preconditions. The physical reasons for this are firstly the very small "quantity" of energy available (stored in the air volume that flows through the aperture) and secondly the characteristics associated with noise generation with pipes or by whistling. Not only does the efficiency of less than 1% play a part, but also the fact that little airflow through a pipe does not generate a sound at all, while excessive airflow through the pipe leads to so-called "overblowing" (so that the pipe octaviates).

In both cases (little pressure or a lot of pressure) no unequivocal warning sound is generated. In a mechano-acoustic generation of the warning signal the warning signal is produced by flow, whereby no unequivocal allocation of the signal type is possible. Furthermore, no test function can be implemented without creating real conditions. Due to the warning signal being generated in a purely mechanical way, retrofitting requires intervention in the mechanics so that integration is time-consuming and cost expensive. Furthermore, the mechanism is susceptible to icing, and it is possible that signals can only be generated with low acoustic pressure ("low volume").

U.S. Pat. No. 5,337,977 discloses a ventilation aperture in an aircraft door, which ventilation aperture shall prevent that the door, which may be pressurised, can be opened. No warning function is generated; instead, the described device blocks the opening procedure if there is overpressure in the cabin. Consequently, any evacuation that may be necessary may be delayed.

SUMMARY OF THE INVENTION

It may be an object of the present invention to disclose a reliable cabin-pressure warning system.

A pressure-difference warning system, a cabin door with a pressure-difference warning system, an aircraft with a pressure-difference warning system or with a door, a method for generating an acoustic signal as a pressure-difference warning signal, a computer-readable storage medium and a program element with the characteristics according to the independent claims is provided.

According to an exemplary embodiment of the present invention a pressure-difference warning system is provided which comprises an acoustic signal device, an energy supply device and a pressure sensor. The pressure sensor is adapted to measure a pressure difference between a first region and a second region. The first and second region can be separable by a movable door element. The energy supply device is designed to provide energy for operating the warning system. The acoustic signal device is designed to output an acoustic signal if the measured pressure difference exceeds a specifiable threshold value.

In particular the first and second region can be separable from a cabin door, a freight door, a service flap or any other pressurised opening or closed opening of a fuselage.

According to another exemplary embodiment of the present invention a door with a pressure-difference warning system with the above-mentioned characteristics is created.

The door may in particular be a cabin door, a freight door, or a service door or flap.

According to a further exemplary embodiment of the present invention an aircraft with a pressure-difference warning system with the above-described characteristics or with a door with the above-described characteristics is created.

According to still another exemplary embodiment of the present invention a method for generating an acoustic signal as a pressure-difference warning signal is provided, in which method energy for measuring a pressure difference between an interior region and an exterior region, and for generating an acoustic signal is provided in which a pressure difference between the interior region and the exterior region is measured and in which an acoustic signal is output if the measured pressure difference exceeds a specifiable threshold value.

Furthermore, according to another exemplary embodiment of the present invention a computer-readable storage medium is provided in which a program for generating an acoustic signal is stored as a pressure-difference warning signal, which program, if it is executed by a processor, controls the process steps described above.

Moreover, according to another exemplary embodiment of the present invention a program element for generating an acoustic signal as a pressure-difference warning signal is provided, which program element, if it is executed by a processor, controls the process steps described above.

The invention may be implemented both by means of a computer program, i.e. software, and by means of one or several special electrical circuits, i.e. in hardware, or in any desired hybrid form, i.e. by means of software components and hardware components.

The pressure sensor may be adapted to measure a pressure difference between an interior region (for example the interior of a cabin) and an exterior region (for example the exterior of a cabin). An interior region or exterior region may be a spatial volume or a spatial region that may have a pressure. The respective spatial region may have an internal pressure or an external pressure, wherein there may be a pressure difference between the internal pressure and the external pressure. Thereby the pressure difference may be formed calculatively by firstly measuring the absolute internal pressure and external pressure and subsequently the difference may be calculated. However, it may be also possible to use pressure sensors which may merely measure the difference between the external pressure and the internal pressure.

The energy supply unit may provide the energy required for operating the warning system. As soon as the pressure difference measured between the interior region and the exterior region may exceeds a specifiable threshold value, the acoustic signal device can output an acoustic signal.

Advantageously, perception of an acoustic warning signal generated by an acoustic warning device may be independent of the lighting conditions and the degree of illumination of the surroundings. The acoustic warning signal may not depend on the degree of attention paid by an operator. In a purely visual signal device according to the state of the art, a requirement for the perception of the warning signals may be that the visual signals being noticed by an operator. Acoustic signals may be essentially perceived independently of the direction.

By means of the acoustic signal device an operator can be made aware of any differential pressure that may be present between the interior region and the exterior region. Thus, it may be prevented that for example following the unlocking of a door the door moves in an explosive or jerky manner due to the prevailing pressure difference between the interior region and the exterior region, and thereby causing injury to an operator. An explosive or jerky movement may for example be caused by the internal pressure being higher than the external pressure. Thereby a door or a door element which is for example movable by activation may be ripped outward. Such explosion-like forces may occur at any movable or unlocked closing of a pressurised aperture. If there may lack of a locking that produces a corresponding force required for preventing equalisation of a pressure difference between a first spatial region and a second spatial region of different pressure it may no longer be possible to produce adequate force for safely closing the aperture. It would thus be possible for an interior operator to be dragged out to the outside, together with the door or the closing of the aperture, and thereby may sustain injuries. Moreover, an operator located on the outside may be struck by the outward moving door.

Pressure sensors are available in a host of embodiments. Usually a membrane may be used which is connected to a hand or whose deformation is converted to an electrical current or an electrical voltage. The use of pressure sensors may provide an advantage in that they are available for large and predefined settable tolerance bands. Consequently, for example threshold values for pressure differences may be set very accurately. This setting may cause the acoustic warning signals to be output only from a predefined pressure difference that in advance is determined to be hazardous. Thereby any unnecessary waiting for the reduction of an insignificant pressure difference can be avoided.

By supplying energy to the pressure-difference warning system, generating acoustic signals may be made independent of prevailing physical marginal conditions. For example a sound level may be set to a constant value independently of the pressure difference between the interior region and the exterior region, in particular between the cabin interior and the cabin exterior. Advantageously, small pressure differences may be signalled just as loudly as large pressure differences. However, in particular applications it may also be sensible to generate a sound level that may be independent of the pressure. This, too, is made possible by an energy supply to provide energy for operating the warning system. By means of the energy supply a sound level may also be set such that any possible background noises are drowned out by the warning signal.

A pressure-difference warning system may not only be used in means of transport such as for example buses, trains or aircraft, but also in devices that are for example used in the simulation of pressures, or in compression chambers for divers.

According to a further exemplary embodiment of the present invention a pressure-difference warning system is provided that in addition to an acoustic signal output issues a visual signal. By means of the visual signal output the degree of attention that the warning system attracts may be increased. In this way the probability of a potentially existing pressure difference being perceived by an operator may be increased.

According to a further exemplary embodiment of the present invention a pressure-difference warning system comprising at least one additional sensor for the acquisition of at least one additional parameter is disclosed. Each of the at least one additional sensors provides a sensor signal with a corresponding value. Thereby the corresponding values may be measured values or other marginal conditions to be recognised. Thereby a switch may also be considered to be a sensor. Environmental conditions such as for example the position of a switch or analogous measured values such as temperatures or angles can be provided as prerequisites for triggering an acoustic signal. By means of a logic AND gating a trigger condition may be implemented by series connection of a plurality of sensor signals. The trigger condition may be selected such that it is met only if all individual conditions are satisfied at the same time. Therewith a profile may be preparable that is responsible for triggering a warning signal. Advantageously thus the trigger condition may be determined very accurately. And as a result of this, for example different philosophies relating to emergency scenarios may be determined.

As stated in further exemplary embodiments of the present invention, the at least one sensor may be an evacuation-slide sensor or a door opening sensor. An evacuation-slide sensor or evacuation-slide lever may comprise two positions which, converted to corresponding values or signals, may be used as input values for a cabin-pressure warning system. An evacuation-slide lever may comprise the two positions "Armed" and "Disarmed". During a flight the evacuation-slide lever is moved to the "Armed" position. This may indicate that in this phase of the flight, opening of the door or of the movable door element, of the freight door or of the service flap or of any other pressurised closing of an opening between two pressure regions does not take place under normal conditions. If the door is opened in this phase it must be an emergency scenario. In this emergency situation any opening of a cabin door may automatically cause an evacuation-slide to be deployed.

In the "Disarmed" position any triggering of the deployment of an evacuation-slide may be deactivated. This may make it possible to open the doors under normal conditions, i.e. without triggering deployment of the evacuation-slides. If the evacuation-slide lever is in the "Disarmed" position, this may be considered a signal for door opening under normal conditions. In this case no emergency- or evacuation scenarios or situations may have to be taken into account. This means that in the case of existing residual pressure, i.e. a corresponding pressure difference between the interior region and the exterior region, there may be time to wait for the residual pressure to be reduced. A warning note concerning the residual pressure thus may be sensible.

The intention of an operator to open the door or some other door element or window element under normal conditions may be signalled by means of a door opening sensor or hand lever for opening a door, which sensor or hand lever for example may be moved by more than 2° from its original position. Sensors that make it possible to detect an angle may be available.

Thus, one possible trigger condition for a pressure difference warning under normal boarding conditions might be the evacuation-slide sensor being in the "Disarmed" position, at the same time the door opening lever (or door opening sensor) being moved by more than 2° from its original position, and a residual pressure, in particular a residual cabin pressure, of more than e.g. 4 hPa being present. The residual cabin pressure might be registered by the pressure sensor of the pressure-difference warning system.

If the evacuation-slide lever may be practically in the "Disarmed" position and if the residual cabin pressure may exceed 4 hPa, the cabin-pressure warning system may be armed or may become armed. This means that two possible trigger conditions may be met. The third trigger condition might determine that the door opening lever is moved by more than 2° from its original position, whereby the door may not yet be unlocked to a dangerous extent, wherein however an operator may signal the intention of being about to open the door. As soon as this third trigger condition may be met a warning sound may be issued by way of the acoustic signal device, which warning sound may inform an operator that a hazardous situation exists and draws the operator's attention to it.

If this were an emergency situation, i.e. if the evacuation-slide lever were in the "Armed" position, the pressure-difference warning system would not be armed. Consequently, opening the door or the movable door element would not result in a warning signal being generated, so that any fast evacuation of the aircraft, which fast evacuation may be necessary in an emergency situation, is not impeded. However, with the option of variable creation of trigger conditions for the pressure-difference warning system a warning sound may be generated in the emergency situation whereby, however, despite there being an emergency an operator might be prevented from opening the door so that evacuation would be delayed.

According to a further exemplary embodiment of the present invention the warning system is a self-sufficient system. The design as a self-sufficient system may make it possible to retrofit the system in an easy way. The pressure-difference warning system can be implemented as a black-box or a retrofit set. The self-sufficient system may acoustically indicate the presence of residual pressure, in particular residual cabin pressure, for example if the door opening lever may be activated, even without the internal voltage supply, as it may have its own energy supply device. The term "self-sufficient system" refers to a system that does not require any additional components for complete function. However, it may also be advantageous to integrate already existing sensors in the self-sufficient system. For example an existing pressure sensor could be connected to the self-sufficient system. Or it might be necessary to feed pressure to the pressure-difference warning system by way of a hose system.

According to a further exemplary embodiment of the present invention a pressure-difference warning system is stated, wherein the energy supply device can be operated independently of a cabin energy supply device. A cabin energy supply device is in particular a device that supplies energy to a spatial region, in particular to a cabin, in particular to devices contained therein. The pressure-difference warning system may thus be provided so as to be separate of a main energy supply source. In other words this means that the pressure-difference warning system may comprise its own energy supply device that is separate from the cabin energy supply device. In an emergency it may be that external energy supply devices, such as for example cabin energy supply devices, may not be available. However, if required, the pressure-difference warning system may be ready for operation also in emergencies.

An energy supply device that is operable independently of a cabin energy supply device may also make longer holding times possible (of e.g. an aircraft). If after an extended holding time, for example six months, an aircraft may be put into service again, a safety system such as the pressure-difference warning system may be ready for action immediately and without any external or internal on-board voltage. Advantageously this may be made possible by or supported by an independent energy supply device.

According to further advantageous exemplary embodiments of the present invention, pressure-difference warning systems with various energy supply devices are stated. An electro-chemical energy supply device is one example of an energy supply device. This may comprise for example accumulator batteries or batteries. They may be economical and may store electrical energy over an extended period of time.

A further example of an energy supply device may be a capacitor or power capacitor or a bank of capacitors which advantageously may provide electrical energy to the cabin-pressure warning system, while having a comparatively light intrinsic weight.

Furthermore, it may be possible to use a regenerative energy supply device. Examples of regenerative energy supply devices may comprise solar cells or energy supply devices which draw energy from movement and/or pressure and/or heat.

According to a further exemplary embodiment of the present invention a pressure-difference warning system is provided in which the acoustic signal device is a piezosiren. Advantageously, a piezosiren may have very small dimensions. For example, a piezosiren measuring a mere 96×60×20 mm may produce a loud signal tone of approximately 113 dB/1 m. Moreover, a piezosiren practically may include a sound generator. A piezocrystal in a piezosiren may commence to generate a sound when a voltage is applied. Advantageously it may thus be very easy to provide an acoustic signal device for a pressure-difference warning system. Moreover, in this way a pressure-difference warning system with few components and thus of light weight may be implemented.

According to a further exemplary embodiment of the present invention a pressure-difference warning system is provided that comprises a control device. The control device is coupled to the acoustic signal device and to the pressure sensor and is designed such that it drives the acoustic signal device for outputting an acoustic signal if the pressure difference measured by the pressure sensor exceeds a specifiable threshold value. Advantageously, a control device may be able in a position to carry out complex functions and to detect complex trigger conditions. By means of a control device it may thus be possible in a targeted way to detect scenarios during which an acoustic warning signal is to be output. Mostly control devices may be programmed, why changes in the trigger conditions may be made quickly. In an aircraft the trigger conditions may thus be individually specified for each flight.

Advantageously by way of a door with a pressure-difference warning system, in particular by way of a cabin door with a pressure-difference warning system with the features described above, a relationship may be established between an operator and the opening of a particular cabin door, of a door element, of a freight door or of a service flap or flap. Thus, an operator may link the operation of a door opening lever with a dangerous situation and may react to it.

According to a further exemplary embodiment of the present invention a pressure-difference warning system is provided that is adapted to be a cabin pressure warning system, freight-door pressure warning system or service-flap warning system. So advantageously various closings of pressurised openings, in particular pressurised closings, may be provided with a pressure-difference warning system.

According to a further exemplary embodiment of the present invention an aircraft with a pressure-difference warning system or with a cabin door is provided. By the pressure equalisation that takes place in an aircraft (for example after completion of a flight) differences between the external pressure and the internal pressure may often occur. Thus, advantageously, by means of a pressure-difference warning system hazardous situations during the opening of doors, in particular of cabin doors in aircraft, may be prevented.

Many improvements of the invention are described in relation to the pressure-difference warning system. These embodiments thus also apply to the door, the freight door, the service flap or cabin door, each of which comprises a pressure-difference warning system, the aircraft with a pressure-difference warning system or with a door, to the method for generating an acoustic signal as a pressure-difference warning signal, to the computer-readable storage medium and to the program element.

Below, advantageous embodiments of the present invention are described with reference to the figures:

DETAILED DESCRIPTION OF EXEMPLARY EMBODIMENTS

Figure 1:
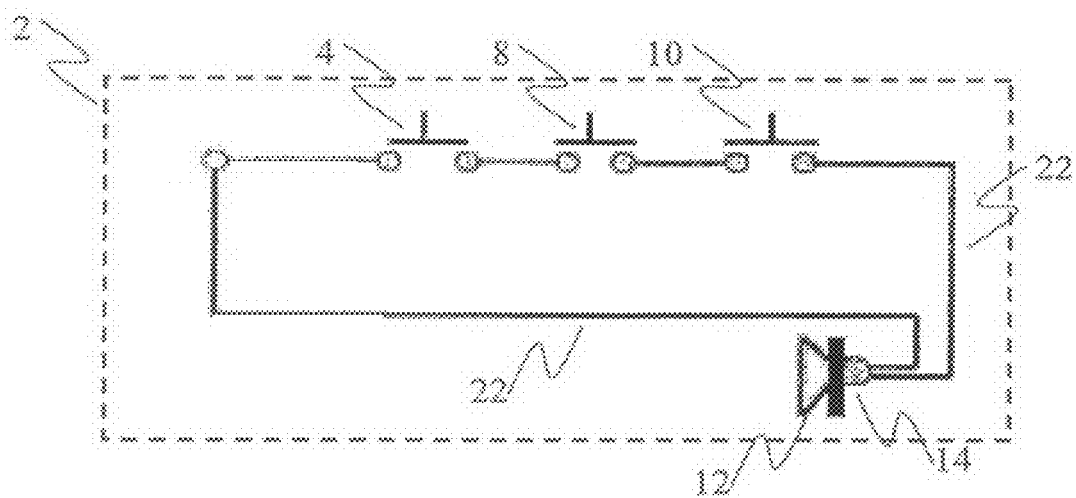
FIG. 1 shows a pressure sensor warning system with a pressure sensor and two additional sensors according to one exemplary embodiment of the present invention.

The illustrations in the figures are diagrammatical and not to scale. In the following description of FIGS. 1 to 3 the same reference characters have been used for identical or corresponding elements.

FIG. 1 shows a pressure-difference warning system 2 with a pressure sensor 4 and two additional sensors 8, 10 according to one exemplary embodiment of the present invention.

The pressure-difference warning system 2 comprises the pressure sensor 4, an evacuation-slide sensor 8 and a door opening sensor 10. It also comprises an acoustic signal device 12 and an energy supply device 14. In FIG. 1 the sensors 4, 8 and 10 are shown as simple electrical switches in an electrical circuit. This type of illustration on the one hand indicates that the sensors are sensors that can detect and signal threshold values. On the other hand, the sensors can also provide analogue signals. However, the illustration showing an electrical circuit should not limit the invention only to logic AND conditions in electrical circuits.

Via a line 22 the sensors 4, 8 and 10 are connected in series and are connected to the energy supply device 14 and to the acoustic signal device 12. Thereby the series connection of the sensors 4, 8 and 10 represents a (logic) AND gating as a prerequisite for triggering the acoustic signal device 12. In the exemplary embodiment the threshold value of the pressure sensor 4 is 4 hPa. If the pressure sensor 4 determines a pressure difference or a residual cabin pressure of 4 hPa or above, one of the three AND conditions is met. In this case reaching or exceeding the threshold value is equivalent to closing the switch.

The evacuation-slide lever 8 signals two positions of the evacuation-slide lever. The open case as shown is the "Armed" position, while in the "Disarmed" position the switch is closed. In this context it can either be a physically closed switch or a corresponding logic signal, for example with a logic value of "1" for switch closed, and with a logic value of "0" for switch open, or it can be a High signal or a Low signal.

If the signal of the evacuation-slide lever also meets the one trigger condition, in the case shown in FIG. 1 this means that the switch 8 is closed, the pressure-difference warning system 2 is armed. This means that triggering the acoustic signal device 12 then only depends on the position of the door opening switch 10, or on the signal generated by this switch. The door opening switch 10 is closed as soon as a hand lever for opening the door is moved from its original position by more than 2°. Thereby signalling that an operator of a door is about to open the door. If the pressure-difference warning system is armed, i.e. if the evacuation-slide lever is in the "Disarmed" position and if a residual pressure of more than 4 hPa is present, then a through connection between the signal device 12 and the energy supply device 14 is established. Consequently, if the door opening lever 10 is moved by more than 2° the acoustic signal of the acoustic signal device 12 sounds.

The acoustic signal device 12 can be a piezosiren. Said piezosiren can generate a particularly advantageous acoustic signal of 113 dB/1 m. However, by using other acoustic signal devices other loudness volumes can be generated.

The presence of an energy supply device 14 that provides the energy required to generate the acoustic signal is a further prerequisite for generating an acoustic signal. If, as is shown in FIG. 1, the energy supply device 14 is located in the pressure-difference warning system 2 (for example a cabin-pressure warning system), then the pressure-difference warning system 2 is quasi self-sufficient. A warning function is thus provided even if neither an external nor an internal on-board voltage exists. Furthermore, an acoustic signal can be generated whose loudness is always the same, irrespective of the pressure difference.

By inserting additional AND conditions, which in FIG. 1 are shown as key buttons, any desired trigger conditions can be stated. The trigger conditions can be additional parameters that are acquired by way of sensors or switches.

Figure 2:
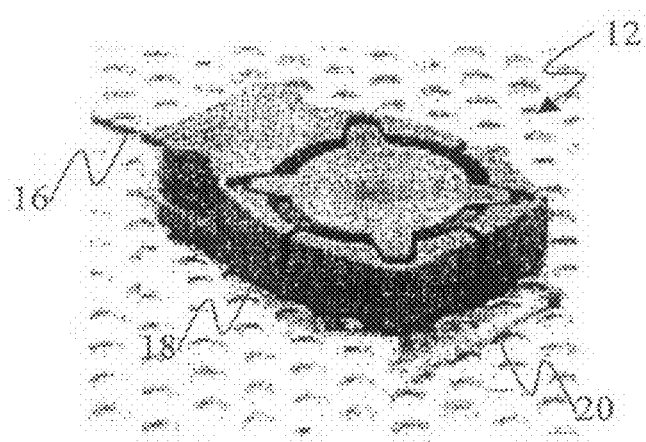
FIG. 2 shows an acoustic signal device according to one exemplary embodiment of the present invention.

FIG. 2 shows an acoustic signal device according to one exemplary embodiment of the present invention. In FIG. 2 a piezosiren 12 is depicted with a match 20 shown as an indication of scale. In the advantageous embodiment the size of the piezosiren 12 is 96×60×20 mm. According to other exemplary embodiments, piezosirens according to the invention can be different in size.

The piezosiren 12 shown in FIG. 2 is an electro-acoustic sound transducer that is accommodated in an encapsulated housing 18. By way of the inlet line 16 the piezosiren 12 is connected to at least one of the sensors 4, 8, 10 and to the energy supply device 14. It is also possible for the energy supply device 14 to be accommodated in the housing 18. Depending on its intended use the housing 18 can be made of metal or plastic or of some other suitable material. Plastic is associated with the advantage of being very light in weight.

The use of electro-acoustic signal devices provides an advantage in that a warning signal which is electrically generated by electro-acoustic sound transducers is unequivocally perceived as a warning signal. It can advantageously generate sound pressure of more than or equal to 113 dB. However, signals below 113 dB can also be generated. Furthermore, an electro-acoustic signal device can be tested using a test function, irrespective as to whether or not the corresponding trigger condition is present.

Purely electrical operation, for example battery operation, makes possible simple integration in existing systems. With the service life of today's batteries the small energy uptake required for a piezosiren to generate an acoustic signal allows a battery change of more than two years. Furthermore, electro-acoustic transducers are insensitive to icing and support great sound pressures. The compact design and the small number of components required for the piezosiren to generate a sound signal make possible a lightweight construction of the pressure-difference warning system.

A piezosiren does not require an external sound generator or oscillation generator in order to generate a warning sound. Due to the characteristics of piezocrystal the piezosiren immediately commences to generate a sound as soon as a voltage is applied. Consequently, a piezosiren can easily be driven, for example by a control device.

Figure 3:
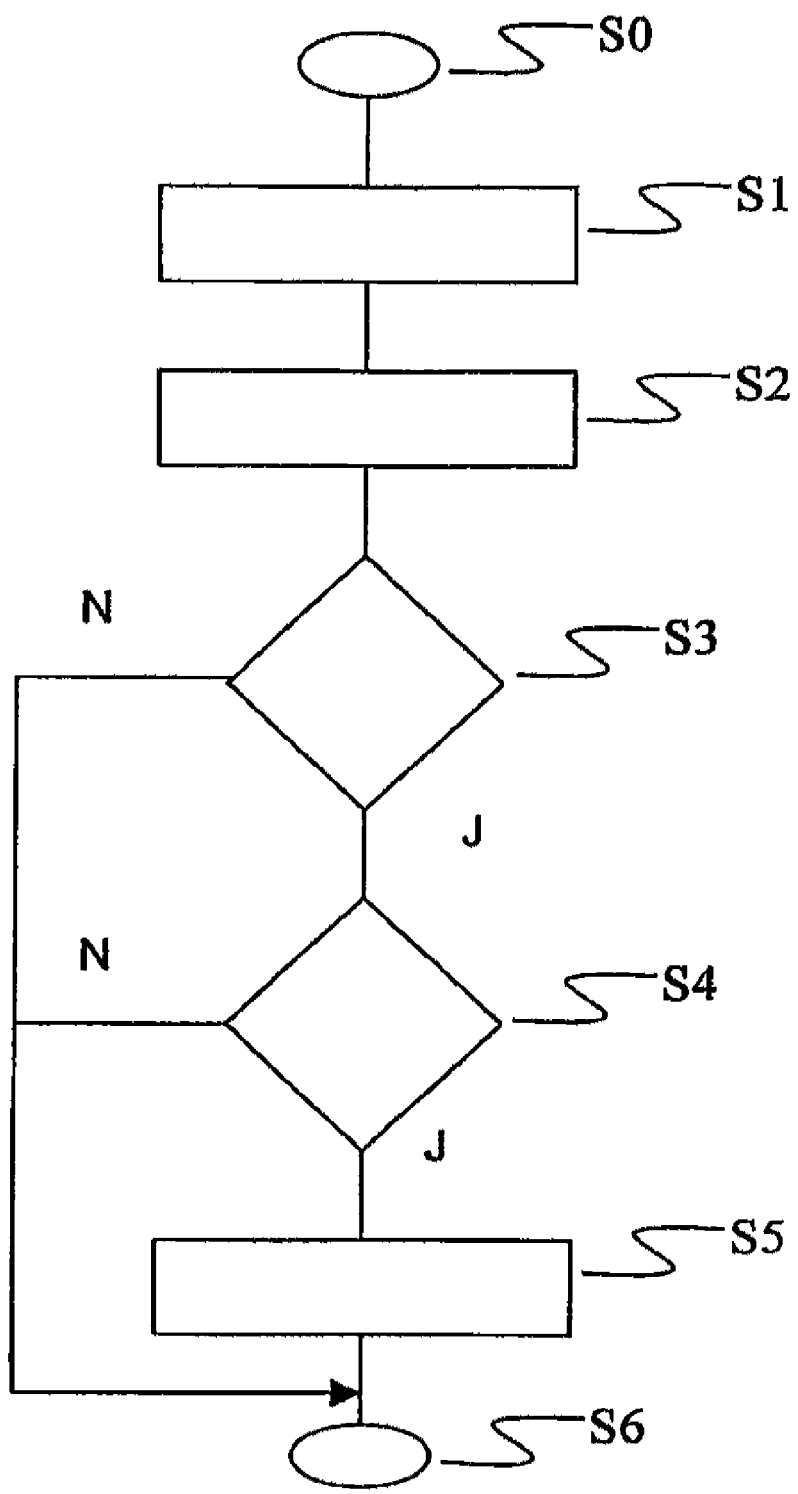
FIG. 3 depicts a method for generating an acoustic signal as a pressure-difference warning signal according to one exemplary embodiment of the present invention.

FIG. 3 shows a flow chart according to a method for generating an acoustic signal as a pressure-difference warning signal according to one exemplary embodiment of the present invention.

Commencing with a start condition in step S0, FIG. 3 shows that at first energy for measuring a pressure difference between the interior region and the exterior region, in particular the cabin interior and the cabin exterior in step S1, and to generate an acoustic signal is provided.

In step S2 by means of a pressure sensor a pressure difference between the cabin interior and the cabin exterior is measured, and in step S3 this pressure difference is compared to a threshold value. If this threshold value is below a specifiable threshold value that indicates a hazardous situation, then a jump to the end state S6 occurs and no warning signal is output.

However, if the threshold value is exceeded or reached, then in step S4 it is determined whether additional specifiable marginal conditions, such as for example the operation of a door handle by more than 2°, are present. If at least one of the other marginal conditions that are to be checked in step S4 is not met, then again a jump to the end state S6 occurs without an acoustic warning signal output.

However, if all additional marginal conditions are met in step S4, and if in addition the pressure threshold value is reached, then in step S5 a warning signal is output or an acoustic signal device is driven in order to output a warning signal. The method shown in FIG. 3 can also be carried out by a control device, such as for example a processor.

Moreover, each of the device-related claims can be implemented as a process step and vice versa.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

The invention claimed is:

1. A pressure-difference warning system for a movable door to warn of a pressure difference between an interior cabin region and an exterior cabin region, comprising:
   an acoustic signal device;
   an energy supply device;
   a pressure sensor;

an evacuation-slide sensor;
a door opening sensor;
a control device;
wherein the pressure sensor is adapted to measure a pressure difference between the interior cabin region and the exterior cabin region, separated by the movable door;
wherein the energy supply device is adapted to provide energy for operating the warning system;
wherein the control device is coupled to the acoustic signal device, the pressure sensor, the evacuation-slide sensor and the door opening sensor and is adapted to drive the acoustic signal device for outputting an acoustic signal if the following conditions are all satisfied: the pressure difference measured by the pressure sensor exceeding a specifiable threshold value, the evacuation slide-sensor signaling that an evacuation-slide lever is in a disarmed position, and the door opening sensor signaling that a door opening lever is moved.

2. The pressure-difference warning system of claim 1, further comprising:
a visual signal device that is adapted such that in addition to the signal output by the acoustic signal device it outputs a visual signal if the measured pressure difference exceeds a specifiable threshold value.

3. The pressure-difference warning system of claim 1, further comprising:
at least one additional sensor for acquiring at least one additional parameter;
wherein the acoustic signal device is adapted such that an acoustic signal is generated only if cumulatively each of the at least one additional sensor provides a sensor signal of a corresponding value.

4. The pressure-difference warning system of claim 1;
wherein the warning system is designed as a self-sufficient system.

5. The pressure-difference warning system of claim 1;
wherein the energy supply device is operable independently of a cabin energy supply device.

6. The pressure-difference warning system of claim 1;
wherein the energy supply device is an electrochemical energy supply device.

7. The pressure-difference warning system of claim 1;
wherein the energy supply device is a capacitor.

8. The pressure-difference warning system of claim 1;
wherein the energy supply device is a regenerative energy supply device.

9. The pressure-difference warning system of claim 1,
wherein the acoustic signal device is a piezosiren.

10. The pressure-difference warning system of claim 3,
wherein the control device is coupled to the additional sensor, of which there is at least one, and is designed such that it drives the acoustic signal device only in those cases, for generating an acoustic signal, when cumulatively each of the additional sensors, of which there is at least one, provides a sensor signal of a corresponding value.

11. The pressure-difference warning system of claim 1,
adapted as one of a group consisting of a cabin-pressure warning system, a freight-door pressure warning system and a service-flap pressure warning system.

12. A door comprising a pressure-difference warning system for a movable door to warn of a pressure difference between an interior cabin region and an exterior cabin region, the warning system comprising:
an acoustic signal device;
an energy supply device;
a pressure sensor;
an evacuation-slide sensor;
a door opening sensor;
a control device;
wherein the pressure sensor is adapted to measure a pressure difference between the interior cabin region and the exterior cabin region, separated by the movable door;
wherein the energy supply device is adapted to provide energy for operating the warning system;
wherein the control device is coupled to the acoustic signal device; the pressure sensor, the evacuation-slide sensor and the door opening sensor and is adapted to drive the acoustic signal device for outputting an acoustic signal if the following conditions are all satisfied: the pressure difference measured by the pressure sensor exceeding a specifiable threshold value, the evacuation slide-sensor signaling that an evacuation-slide lever is in a disarmed position, and the door opening sensor signaling that a door opening lever is moved.

13. An aircraft comprising a pressure-difference warning system for a movable door to warn of a pressure difference between an interior cabin region and an exterior cabin region, the warning system comprising:
an acoustic signal device;
an energy supply device;
a pressure sensor;
an evacuation-slide sensor;
a door opening sensor;
a control device;
wherein the pressure sensor is adapted to measure a pressure difference between the interior cabin region and the exterior cabin region, separated by the movable door;
wherein the energy supply device is adapted to provide energy for operating the warning system;
wherein the control device is coupled to the acoustic signal device, the pressure sensor, the evacuation-slide sensor and the door opening sensor and is adapted to drive the acoustic signal device for outputting an acoustic signal if the following conditions are all satisfied: the pressure difference measured by the pressure sensor exceeding a specifiable threshold value, the evacuation slide-sensor signaling that an evacuation-slide lever is in a disarmed position, and the door opening sensor signaling that a door opening lever is moved.

14. A method for generating an acoustic signal as a pressure-difference warning signal, comprising:
coupling a control device to an acoustic signal device, a pressure sensor, an evacuated-slide sensor, and a door opening sensor;
providing energy for measuring a pressure difference between an interior cabin region and an exterior cabin region and for generating an acoustic signal;
measuring, with the pressure sensor, a pressure difference between the interior cabin region and the exterior cabin region separated by a movable door;
outputting an acoustic signal if the following conditions are all satisfied: the measured pressure difference exceeds a specifiable threshold value, the evacuation slide-sensor signals that an evacuation-slide lever is in a disarmed position, and the door opening sensor signals that a door opening lever is moved.

15. The method of claim 14, wherein the method further comprises:
outputting a visual signal if the measured pressure difference exceeds a specifiable threshold value.

16. The method of claim 14, wherein the method further comprises:

measuring at least one additional sensor signal;

outputting an acoustic signal only if cumulatively each of the at least one additional sensor signals has a corresponding value.

17. A non-transitory computer-readable storage medium in which a program for generating an acoustic signal as a pressure-difference warning signal is stored, which when executed by a computer, controls the computer to:

couple a control device to an acoustic device, a pressure sensor, an evacuation-slide sensor, and a door opening sensor;

provide energy for measuring a pressure difference between an interior cabin region and an exterior cabin region and generate an acoustic signal;

measure, with the pressure sensor, a pressure difference between the interior cabin region and the exterior cabin region separated by a movable door;

output an acoustic signal if the following conditions are all satisfied: the measured pressure difference exceeds a specifiable threshold value, the evacuation slide-sensor signals that an evacuation-slide lever is in a disarmed position, and the door opening sensor signals that a door opening lever is moved.

18. A pressure-difference warning system for a movable aircraft door to warn of a pressure difference between a first cabin region and a second cabin region separated by the door, comprising:

an acoustic signal device for outputting an acoustic signal;

a single pressure sensor adapted to take a single reading of a pressure difference between the first cabin region and the second cabin region; and an evacuation-slide sensor;

a door opening sensor; and a control device coupled to the acoustic signal device, the pressure sensor, the evacuation-slide sensor, and the door opening sensor, the control device adapted to obtain the single reading of the pressure difference and to provide a signal to the acoustic signal device if the following conditions are all satisfied: the pressure difference measured by the single pressure sensor exceeding a specifiable threshold value, the evacuation slide-sensor signaling that an evacuation-slide lever is in a disarmed position, and the door opening sensor signaling that a door opening lever is moved;

wherein the first cabin region is an internal region of a cabin and the second cabin region is an exterior region of the cabin.

* * * * *